Patented Jan. 1, 1946

2,392,041

UNITED STATES PATENT OFFICE 2,392,041

STABILIZATION OF POLYVINYL ACETAL RESINS

Frazier Groff, Lakewood, Ohio, assignor to Carbide and Carbon Chemicals Corporation, a corporation of New York No Drawing. Application July 2, 1941, Serial No. 400,795

10 Claims. (Cl. 260—73)

Polyvinyl acetal resins represent one of the outstanding developments of the past few years in the field of synthetic resins, and, certain polyvinyl partial acetal resins, which are derivatives of polyvinyl alcohol incompletely acetalized with an aldehyde and containing free hydroxyl groups, when combined with plasticizers to form resilient and tough compositions, have come into increasing prominence for use as interlayers for safety glass. Polyvinyl partial acetal resins are more fully described in United States Patents, 2,162,678, 2,162,679 and 2,162,680, to Harold F. Robertson, and their use in laminated glass is the subject of United States Patent 2,120,628 to Ernest W. Reid. The production of plastic compositions from these resins which are suitable as interlayers for laminated glass is the subject of my prior patents, 2,120,934 and 2,120,935.

Polyvinal partial acetal resins are subject to some deterioration when subjected to heat and light, although they may be exposed for years at ordinary temperatures without undergoing significant change, and, at moderately elevated temperatures of about 45° C., they remain stable for an indefinite period. However, when these resins are heated in air at temperatures of about 135° C. for several hours, or when they are exposed to intense radiation in the presence of air for prolonged periods, a gradual deterioration of the resins takes place. Upon severe heat treatment these changes are accompanied by discoloration, loss in weight, and insolubility of the resins. Exposure to intense radiation appears to result in a degradation of the molecular structure of the resins, as well as discoloration, since the viscosity of solutions of the resins is sharply reduced. The presence of oxygen is a definite factor in contributing to the instability of these resins under these conditions, since tests have shown that the polyvinyl acetal resins are far more stable when heated, or exposed to radiation, in the absence of oxygen.

These characteristics of the polyvinyl partial acetal resins have resulted in a problem which is troublesome in the application of the plasticized resins as an interlayer for safety glass. When exposed out of doors for long periods in either humid or relatively dry southern climates, there is a tendency for the glass sandwich to deteriorate at and near the edges where the plastic composition is subjected to direct sunlight and is in contact with air. My tests have shown that serious degradation of plasticized polyvinyl partial acetal resins occurs when they are exposed in air to light and temperature conditions approximating those which exist in the climates peculiar to Florida and Arizona, and that by incorporating small amounts of thiourea or substituted thioureas in the plastic composition, laminated safety glass of superior resistance to heat and light may be produced. These compounds also have a marked stabilizing action on both plasticized and unplasticized polyvinyl partial acetals even at high temperatures of approximately 135° C. and they are, therefore, valuable in protecting the resins and plastics during processing operations at both low and high temperatures.

While many substances have been proposed for stabilizing polyvinyl acetal resins, I have found that thiourea is superior to these substances in stabilizing action against all types of decomposition for polyvinyl acetal resins. The thiourea radical is believed to be the essential stabilizing element since urea and many other basic materials are ineffective for stabilizing polyvinyl acetal resins. The utility of this radical

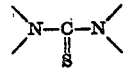

may be increased by substitution of one or more organic radicals on one or both nitrogen atoms of the thiourea molecule. Excellent results have been obtained with mono-allyl thiourea and mono-butyl thiourea and these compounds are more soluble than thiourea in plasticizers such as triethylene glycol dihexoate and dioctyl phthalate, and they may therefore be used in larger amounts without affecting the clarity of the composition. Other substituted thioureas which have been found to be effective stabilizers for polyvinyl acetals, include mono-acetyl thiourea and reaction products of thiourea and formaldehyde, and thiourea and butyraldehyde. These reaction products may be prepared by heating the mixtures at approximately 75° C. for from 20 minutes to about 120 minutes. For example, 25 parts of thiourea and 40 parts of formalin (37.5% HCHO) may be mixed and heated at 75° C. for 1 hour. Other aliphatic substituted thioureas which may be employed include methyl thiourea, ethyl thiourea, propyl thiourea, isopropyl thiourea, isobutyl thiourea, amyl thiourea and 2-ethyl butyl thiourea, as well as cycloalkyl substituted thioureas, such as cyclohexyl thiourea.

The solubility of the thiourea radical in plastic compositions may also be modified by substitution of one or more aryl groups in the thiourea molecule. Phenyl thiourea, a representative of this class, has effective stabilizing action on polyvinyl partial acetal resins. Benzyl thiourea and xylenyl or toluyl thiourea are also usable. It is understood, of course, that other known stabilizing ingredients such as resorcinol disalicylate or diphenyl amine may be included with the thioureas without departing from the scope of the invention as described in the appended claims, and that one or more of the thioureas may be included in the composition.

Polyvinyl partial acetal resins which are particularly susceptible to stabilization according to this invention are those which are acetalized with propionaldehyde, butyraldehyde, or valeraldehyde to the extent of 62% to 88%, 54% to 78%, and 39% to 58% respectively. These materials when in intimate combination with a water-insoluble plasticizer, such as triethylene glycol dihexoate, in which the resins themselves are insoluble at ordinary temperatures, form strong, resilient and adhesive compositions, suitable as interlayers for safety glass. The amount of stabilizer required is small; as little as 0.04% stabilizer by weight of the composition being very effective and, in most cases, not more than 0.5% stabilizer is required. Amounts of stabilizer as high as about 5% might, under exceptional circumstances, be of value. The stabilizer may be incorporated with the resin by any means, such as by adding the stabilizer to the resin during mixing with the plasticizer or in processing operations prior to this step. It is desirable to add the stabilizer before heating the plastic composition in processing operations.

The stabilized plastic compositions of this invention are much more resistant to the effects of heat and light than similar compositions which do not contain the stabilizing ingredients. They will remain relatively colorless, and will exhibit but slight change in viscosity, weight, or solubility, under conditions which will cause severe deterioration of the unstabilized resins as evaluated by these properties. For instance, a polyvinyl butyral resin, approximately 66% acetalized with butyraldehyde, containing about 0.25% of thiourea, remained white in color and retained its solubility in methanol, whereas a similar resin which did not contain a stabilizer became orange-amber in color and insoluble in methanol, when both were heated for five hours at 135° C. Similar results were observed when compositions containing mono-acetyl thiourea, mono-butyl thiourea and mono-allyl thiourea were tested.

Laminated glass having an interlayer made from polyvinyl partial acetal sheets containing thiourea or a substituted thiourea, exhibits improved resistance to deterioration on exposure to the elements. Because of the influence of oxygen on the decomposition of polyvinyl partial acetal resins by light and heat, it may be desirable to have a higher concentration of stabilizer at the edge of the sheet than in the remainder. This may be done by using separate strips of the stabilized plastic composition at the boundaries of the glass sheet, care being taken to insure that the pieces coalesce during the laminating operation and that no flaw is visible in the finished article. Alternatively, a stabilized strip of resin may be caused to adhere to the edges of the laminated glass sheet, whereby it will act as a seal to protect the unstabilized or less highly stabilized resin from contact with air. Also, the exposed edges of the laminated glass may be treated with a solution of the stabilizer in suitable solvents, whereby the solution will be absorbed to some extent by the resin, and the stabilizer deposited upon evaporation of the solvents.

However, since the amount of stabilizer required is small, it is usually more convenient to have the stabilizer uniformly dispersed throughout the polyvinyl acetal resin.

The following examples will illustrate in more detail the practice of the invention:

*Example 1.*—Polyvinyl partial butyral resins were incorporated with 0.25% by weight of mono-acetyl thiourea and mono-butyl thiourea respectively by mixing the resin with a solution of the stabilizer and evaporating the solvent. Upon heating the stabilized compositions for two hours at 135° C., both samples remained white in color and showed a loss in weight of but 0.1% and 0.24% respectively, and the change in viscosity of solutions of the resins in acetic acid was slight. On the other hand, a sample of the same resin which had not been stabilized, after two hours heating at 135° C. was orange-yellow in color, partially insoluble in acetic acid, and had suffered a loss in weight of 0.66%.

*Example 2.*—A sample of polyvinyl butyral resin, approximately 66% acetalized with butyraldehyde, was incorporated with 0.25% by weight of thiourea by mixing the resin with a solution of thiourea in methanol and water, and evaporating the liquids. Upon heating the stabilized sample for four hours at 135° C., there was no loss in weight, no change in color or appearance of the resin, and the resin remained soluble in methanol. The viscosity of a 5% solution of the stabilized resin in acetic acid after the heat test was 82.5 seconds, as measured by the time required to discharge 15 ml. of solution from a 25 ml. graduated pipette, whereas the viscosity of a control sample which had not been heated was 77 seconds, an immaterial variation. On the other hand, a sample of the unstabilized resin after undergoing the same test turned to dull orange color, because insoluble in methanol and acetic acid, and lost weight to the extent of 2.2%.

*Example 3.*—To part of a sample of polyvinyl butyral resin, approximately 66% acetalized with butyraldehyde, 0.25% of thiourea was added, and both stabilized and unstabilized resins were exposed to direct radiation from a 60 ampere sunshine carbon arc. The distance from the arc to the specimens was about 23 inches and the temperature of the specimens was about 45° C. After 65 hours exposure, the viscosity of a 5% solution of the stabilized resin in acetic acid was 55.5 seconds, and the viscosity of the unstabilized resin was 27.5 seconds, whereas the viscosity of a control sample was 84 seconds; the viscosities being determined as in Example 2.

*Example 4.*—Films of plasticized polyvinyl acetal resin, approximately 66% acetalized with butyraldehyde, consisting of (A) 50 parts of resin and 22.5 parts of triethylene glycol dihexoate; (B) 50 parts of resin, 22.5 parts of triethylene glycol dihexoate, and 0.18 part of thiourea; and (C) 50 parts of resin, 22.5 parts of triethylene glycol dihexoate, and 0.18 part of allyl thiourea were prepared by casting the films from solutions of the compositions in methanol. The films, after drying, were approximately 0.012 to 0.015 inch in thickness, and exhibited good clarity when laminated between glass plates by applying heat and pressure.

Samples of each film were supported by a glass plate and covered by another glass plate, so arranged that air could circulate over the surface of the film. The films were exposed to radiation from a 60 ampere sunshine carbon arc, about 38 inches distance from the film, and the temperature of the films during the test was about 45° C. After exposure for 87 hours, the films were dissolved in glacial acetic acid to form 7% solutions and the viscosities of the solutions determined as in Example 2, were as follows:

|  | Viscosity, seconds |
|---|---|
| Sample A (no stabilizer) | 23.5 |
| Sample B (thiourea stabilizer) | 45.3 |
| Sample C (allyl thiourea stabilizer) | 45.5 |
| Sample A (no heat treatment) | 47.0 |

*Example 5.*—Sixty-nine parts of polyvinyl partial acetal resin, approximately 66% acetalized with butyraldehyde, were incorporated with 0.04 part of thiourea and 31 parts of triethylene glycol dihexoate and were calendered into films approximately 0.015 inch thick, according to the processes described in my prior patents, Nos. 2,120,934 and 2,120,935. Laminated safety glass was prepared from this film by placing it between two sheets of glass and subjecting the assembly to heat and pressure.

The laminated glass produced was of excellent clarity and the interlayer did not discolor on heating for 6.75 hours at 135° C., whereas the interlayer of a similar piece of laminated glass, which did not contain a stabilizer, was slightly yellow at its edges after two hours of heating at 135° C. and was orange colored at its edges after heating for 6.75 hours at the same temperature.

Modifications of the invention other than as specifically discussed above will be apparent to those skilled in the art and are included within the scope of the invention.

I claim:

1. A plastic composition resistant to change in color and solubility on exposure to light and heat comprising a polyvinyl partial acetal resin physically admixed with a small amount up to 5% by weight of the composition of a thiourea containing the radical

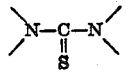

2. A plastic composition resistant to change in color and solubility on exposure to light and heat comprising a polyvinyl partial acetal resin, acetalized within the range 62% to 88% with propionaldehyde, physically admixed with a small amount up to 0.5% by weight of the resin of a thiourea containing the radical

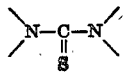

3. A plastic composition resistant to change in color and solubility on exposure to light and heat comprising a polyvinyl partial acetal resin, acetalized within the range 54% to 78% with butyraldehyde, physically admixed with a small amount up to 0.5% by weight of the resin of a thiourea containing the radical

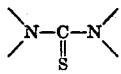

4. A plastic composition resistant to change in color and solubility on exposure to light and heat comprising a polyvinyl partial acetal resin, acetalized within the range 39% to 58% with valeraldehyde, physically admixed with a small amount up to 0.5% by weight of the resin of a thiourea containing the radical

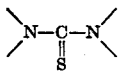

5. A plastic composition resistant to change in color and solubility on exposure to light and heat comprising a polyvinyl partial acetal resin, physically admixed with a small amount up to 5% by weight of the resin of thiourea.

6. A plastic composition resistant to change in color and solubility on exposure to light and heat comprising a polyvinyl partial acetal resin, physically admixed with a small amount up to 5% by weight of the resin of a crystalline N-substituted thiourea.

7. A plastic composition resistant to change in color and solubility on exposure to light and heat comprising a polyvinyl partial acetal resin, physically admixed with a small amount up to 5% by weight of the resin of allyl thiourea.

8. A plastic composition resistant to change in color and solubility on exposure to light and heat comprising a polyvinyl partial acetal resin, physically admixed with a small amount up to 5% by weight of the resin of butyl thiourea.

9. A plastic composition resistant to change in color and solubility on exposure to light and heat comprising a polyvinyl partial acetal resin in combination with a plasticizer, said composition being physically admixed with a small amount up to 5% by weight of the composition of a thiourea containing the radical

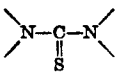

10. A plastic composition resistant to change in color and solubility on exposure to light and heat comprising a polyvinyl partial butyral resin in combination with a plasticizer, said composition being physically admixed with a small amount up to 0.5% by weight of the composition of a crystalline thiourea containing the radical

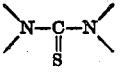

FRAZIER GROFF.

CERTIFICATE OF CORRECTION.

Patent No. 2,392,041.                                        January 1, 1946.

FRAZIER GROFF.

It is hereby certified that error appears in the printed specification of the above numbered patent requiring correction as follows: Page 1, first column, line 19, for "Polyvinal" read --Polyvinyl--; page 2, second column, line 42, for the word "because" read --became--; and that the said Letters Patent should be read with this correction therein that the same may conform to the record of the case in the Patent Office.

Signed and sealed this 5th day of March, A. D. 1946.

Leslie Frazer

(Seal)                                        First Assistant Commissioner of Patents.